United States Patent
Halaf et al.

(10) Patent No.: US 11,067,922 B2
(45) Date of Patent: Jul. 20, 2021

(54) INTERMEDIATE TRANSFER BLANKET

(71) Applicant: Hewlett-Packard Development Company, L.P., Spring, TX (US)

(72) Inventors: Gidi Halaf, Nes Ziona (IL); Ira Yudovin-Farber, Nes Ziona (IL); Michael Kokotov, Nes Ziona (IL); Dina Voloshin Firouz, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/956,053

(22) PCT Filed: Apr. 20, 2018

(86) PCT No.: PCT/US2018/028543
§ 371 (c)(1),
(2) Date: Jun. 19, 2020

(87) PCT Pub. No.: WO2019/203849
PCT Pub. Date: Oct. 24, 2019

(65) Prior Publication Data
US 2020/0371454 A1 Nov. 26, 2020

(51) Int. Cl.
*G03G 15/16* (2006.01)
*B05D 1/00* (2006.01)
*B05D 1/02* (2006.01)
*C09D 183/04* (2006.01)
*C08K 3/04* (2006.01)

(52) U.S. Cl.
CPC ............ *G03G 15/162* (2013.01); *B05D 1/002* (2013.01); *B05D 1/02* (2013.01); *C09D 183/04* (2013.01); *C08K 3/04* (2013.01)

(58) Field of Classification Search
CPC ........ G03G 15/162; B05D 1/002; B05D 1/02; C09D 183/04; C08K 3/04
See application file for complete search history.

(56) References Cited

U.S. PATENT DOCUMENTS

| | | |
|---|---|---|
| 6,009,297 A | 12/1999 | Maeda et al. |
| 6,500,367 B2 | 12/2002 | Naus et al. |
| 6,871,591 B2 | 3/2005 | Buono et al. |

(Continued)

FOREIGN PATENT DOCUMENTS

| | | |
|---|---|---|
| CN | 107209472 | 9/2017 |
| EP | 0986778 | 4/2003 |

(Continued)

OTHER PUBLICATIONS

International Search Report dated Dec. 27, 2018 for PCT/US2018/028543, Applicant Hewlett-Packard Development Company, L.P.

*Primary Examiner* — Sophia S Chen
(74) *Attorney, Agent, or Firm* — Thorpe North & Western LLP

(57) ABSTRACT

The present disclosure relates to a method of producing an intermediate transfer blanket. The method includes spray-coating a blanket body with a release layer composition including a curable polysiloxane polymer and solid particles of an electrically conductive material. The blanket body is subjected to motion during spray-coating, such that the release layer composition is subjected to shear forces as it deposits on the blanket body.

13 Claims, 6 Drawing Sheets

(56) References Cited

U.S. PATENT DOCUMENTS

| | | | |
|---|---|---|---|
| 8,041,275 B2 | 10/2011 | Soria et al. | |
| 8,992,818 B2 | 3/2015 | Mishra et al. | |
| 2008/0034998 A1 | 2/2008 | Byers et al. | |
| 2011/0042856 A1 | 2/2011 | Aoto et al. | |
| 2015/0227065 A1* | 8/2015 | Yu | G03G 15/162 |
| | | | 399/308 |
| 2016/0257612 A1* | 9/2016 | de Paor | C03B 19/1407 |
| 2017/0227881 A1* | 8/2017 | Ishida | |
| 2017/0248874 A1* | 8/2017 | Guslitzer | G03G 15/162 |
| 2018/0104941 A1* | 4/2018 | Free | B32B 3/263 |
| 2019/0076873 A1* | 3/2019 | Shimoda | G03G 15/162 |

FOREIGN PATENT DOCUMENTS

| | | | | |
|---|---|---|---|---|
| EP | 1381473 | | 1/2004 | |
| EP | 2237113 | | 10/2010 | |
| EP | 3538956 | | 9/2019 | |
| JP | 2005262729 | | 9/2005 | |
| WO | WO-2016066232 A1 * | | 5/2016 | G03G 15/162 |

\* cited by examiner

INTERMEDIATE TRANSFER BLANKET

BACKGROUND

An electrophotographic printing process involves creating an image on a photoconductive surface or photo imaging plate (PIP). The image that is formed on the photoconductive surface is a latent electrostatic image having image and background areas with different potentials. When an electrophotographic ink composition containing charged ink particles is brought into contact with the selectively charged photoconductive surface, the charged ink particles adhere to the image areas of the latent image as imaging material, while the background areas remain clean. The image may be transferred to an intermediate transfer blanket and then to the print substrate. The intermediate transfer blanket comprises a release layer that absorbs liquid and facilitates the release of the imaging material to the print substrate.

BRIEF DESCRIPTION OF THE DRAWINGS

Various implementations are described, by way of example, with reference to the accompanying drawings, in which.

DETAILED DESCRIPTION

Figure 1:
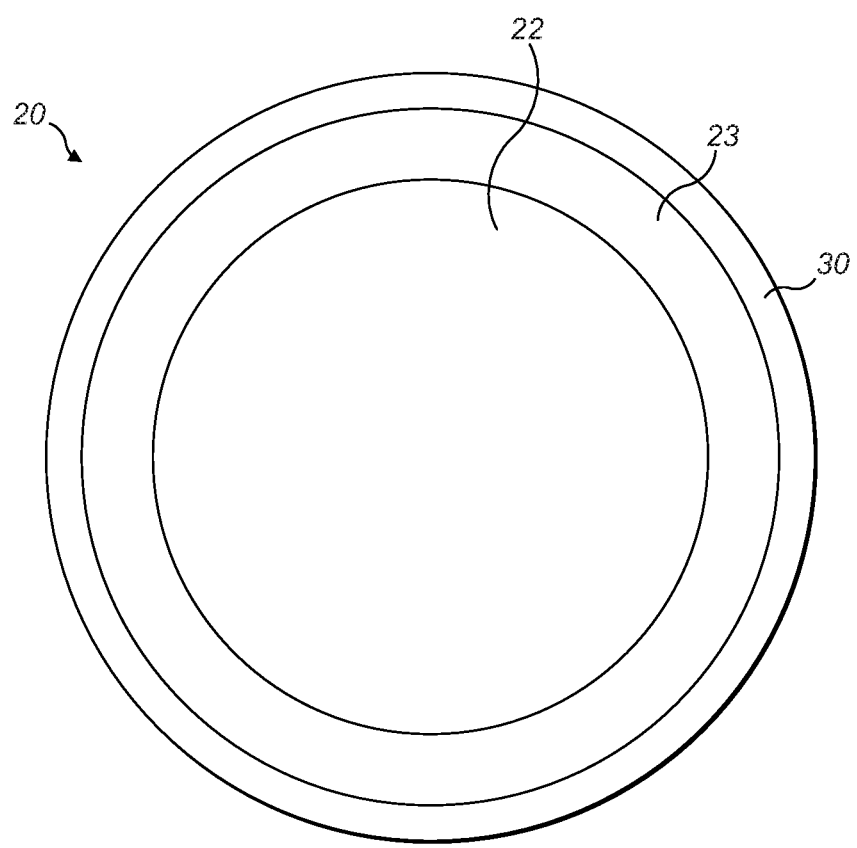
FIGS. 1 to 3 are schematic cross-sectional views of examples of an intermediate transfer blanket.

It is to be understood that this disclosure is not limited to the compositions or methods disclosed herein. It is also to be understood that the terminology used in this disclosure is used for describing particular examples. The terms are not intended to be limiting because the scope of the present disclosure is intended to be limited by the appended claims and their equivalents.

It is noted that, as used in this specification and the appended claims, the singular forms "a," "an," and "the" include plural referents unless the context clearly dictates otherwise.

As used in this disclosure, "electrostatic printing" or "electrophotographic printing" refers to the process that provides an image that is transferred from a photoconductive surface or photo imaging plate indirectly via an intermediate transfer member to a print substrate. As such, the image may not be substantially absorbed into the photo imaging substrate on which it is applied. Additionally, "electrophotographic printers" or "electrostatic printers" refer to those printers capable of performing electrophotographic printing or electrostatic printing, as described above. An electrophotographic printing process may involve subjecting the electrophotographic composition to an electric field, e.g. an electric field having a field gradient of 1-400V/μm, or more, in some examples 600-900V/μm, or more.

As used in the present disclosure, the term "about" is used to provide flexibility to a numerical range endpoint. The degree of flexibility of this term can be dictated by the particular variable and determined based on the associated description herein.

As used in the present disclosure, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used in the present disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Unless otherwise stated, viscosity was measured using an AR-2000 model Rheometer from TAI (Thermal Analysis Instruments)). The rheometer is used as a viscometer, by applying shear forces on the testing sample between two parallel plates. The sample is loaded between parallel plates at a known gap with an oscillatory (sinusoidal) shear profile of from 0.01 to 1,000 s$^{-1}$ at a temperature of 25° C. applied.

As used herein, the abbreviation "acac" refers to acetylacetonate.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

The present disclosure relates to a method of producing an intermediate transfer blanket. The method comprises spray-coating a blanket body with a release layer composition comprising a curable polysiloxane polymer and solid particles of an electrically conductive material. The blanket body is subjected to motion during spray-coating, such that the release layer composition is subjected to shear forces as it deposits on the blanket body.

In some examples, the blanket body is subjected to rotational motion during spray-coating. In some examples, a cylindrical drum, for instance, the interior of a cylindrical drum, is lined with a blanket body. The drum may then be rotated around a spray nozzle, while the spray nozzle ejects the release layer composition to spray-coat the blanket body.

The present disclosure also relates to an intermediate transfer blanket comprising a blanket body and a release layer deposited (e.g. spray-coated) thereon. The release layer comprises a plurality of sub-layers, and at least one of the sub-layers comprises a composition comprising solid particles of an electrically conductive material dispersed in a matrix of cured polysiloxane polymer.

In liquid electrophotographic printing, an intermediate transfer blanket may be used to transfer imaging material from a photoconductive surface to a print substrate. An intermediate transfer blanket may comprise a release layer, for example, on the outermost surface of the blanket. The release layer can absorb liquid carrier from the imaging material and facilitate the release of the imaging material to the print medium. For liquid electrophotographic printing, release layers comprising polysiloxane polymers and solid particles of electrically conductive material (e.g. carbon black) may be employed.

To manufacture an intermediate transfer blanket, a release layer composition may be applied to a blanket body. The release layer composition may be applied by gravure coating. However, it has been found that gravure coating results in the formation of a seam, which arises as the gravure roller engages and disengages the nip point between gravure and impression rollers.

It has also been found that, when release layer compositions comprising polysiloxane polymer and solid particles of an electrically conductive material are spray-coated onto a static blanket body, it can be difficult to achieve a smooth, uniform coating. Without wishing to be bound by any theory, this may be because release layer compositions comprising polysiloxane polymer and solid particles of an electrically conductive material can exhibit non-Newtonian, for example, shear-thinning behaviour. The viscosity of such shear-thinning compositions decrease under increasing shear, but increase when such shear forces are removed. In the present disclosure, it has been found that, by subjecting the blanket body to motion during spray-coating, the release layer composition is subjected to shear forces as it deposits on the blanket body. These shear forces provide the deposited droplets with better droplet mobility. This increased droplet mobility can facilitate the formation of a more uniform and/or smoother coating.

Release Layer Composition

As described above, the intermediate transfer blanket is formed by spray-coating a release layer composition onto a blanket body. The release layer composition comprises a curable polysiloxane polymer and solid particles of an electrically conductive material. The release layer composition may be a UV-curable silicone release formulation. The UV-curable silicone release formulation may comprise a curable polysiloxane polymer and solid particles of an electrically conductive material.

The release layer composition may comprise comprising at least 60 weight %, for example, at least 70 weight % or at least 80 weight % polysiloxane. In some examples, the release layer composition may comprise at most 99.5 weight %, for example, at most 99 weight % or at most 98 weight % polysiloxane. In some examples, the release layer composition may comprise 60 to 99.5 weight %, for instance, 70 to 99 weight %, or 80 to 98 weight % of polysiloxane.

The release layer composition may be a shear-thinning composition. Accordingly, its viscosity may decrease under increasing shear, but increases when such shear forces are removed.

In some examples, the release layer composition may have a viscosity of greater than 500 Pas at a shear rate of less than 0.016 $s^{-1}$, for instance, greater than 700 Pas at a shear rate of less than 0.016 $s^{-1}$, greater than 800 Pas at a shear rate of less than 0.016 $s^{-1}$ or greater than 900 Pas at a shear rate of less than 0.016 $s^{-1}$. In some examples, the release layer composition may have a viscosity of greater than 400 Pas at a shear rate of less than 0.02 $s^{-1}$, for instance, greater than 450 Pas at a shear rate of less than 0.02 $s^{-1}$, greater than 500 Pas at a shear rate of less than 0.02 $s^{-1}$ In some examples, the release layer composition may have a viscosity of less than 250 Pas at a shear rate of greater than 0.08 $s^{-1}$, for instance, less than 200 Pas at a shear rate of greater than 0.08 $s^{-1}$.

In some examples, the release layer composition may have a viscosity of less than 110 Pas at a shear rate of greater than 0.19 $s^{-1}$, for instance, less than 100 Pas at a shear rate of greater than 0.19 $s^{-1}$, less than 90 Pas at a shear rate of greater than 0.19 $s^{-1}$, less than 85 Pas at a shear rate of greater than 0.19 $s^{-1}$.

In some examples, the release layer composition may have a viscosity of less than 60 Pas at a shear rate of greater than 0.4 $s^{-1}$, for instance, less than 55 Pas at a shear rate of greater than 0.4 $s^{-1}$, less than 50 Pas at a shear rate of greater than 0.4 $s^{-1}$, less than 45 Pas at a shear rate of greater than 0.4 $s^{-1}$.

In some examples, the release layer composition may have a viscosity of less than 40 Pas at a shear rate of greater than 0.7 $s^{-1}$, for instance, less than 35 Pas at a shear rate of greater than 0.7 $s^{-1}$, and less than 30 Pas at a shear rate of greater than 0.7 $s^{-1}$.

In some examples, the release layer composition may have a viscosity of less than 20 Pas at a shear rate of greater than 0.9 $s^{-1}$, for instance, less than 18 Pas at a shear rate of greater than 0.9 $s^{-1}$.

In some examples, the release layer composition may have a viscosity of less than 15 Pas at a shear rate of greater than 1.8 $s^{-1}$, for instance, less than 13 Pas at a shear rate of greater than 1.8, less than 10 Pas at a shear rate of greater than 1.8 $s^{-1}$.

In some examples, the release layer composition may have a viscosity of less than 7 Pas at a shear rate of greater than 2.2 $s^{-1}$, for instance, less than 6 Pas at a shear rate of greater than 2.2, less than 5 Pas at a shear rate of greater than 2.2 $s^{-1}$.

In some examples, the release layer composition may have a viscosity of less than 5 Pas at a shear rate of greater than 4.2 $s^{-1}$, for instance, less than 4 Pas at a shear rate of greater than 4.2 $s^{-1}$.

In some examples, the release layer composition may have a viscosity of less than 1 Pas at a shear rate of greater than 30.2 $s^{-1}$, for instance, less than 0.8 Pas at a shear rate of greater than 30.2 $s^{-1}$.

In some examples, the release layer composition may have a viscosity of less than 0.8 Pas at a shear rate of greater than 50.5 $s^{-1}$, for instance, less than 0.7 Pas at a shear rate of greater than 30.2 $s^{-1}$.

In some examples, the release layer composition may have a viscosity of less than 0.4 Pas at a shear rate of greater than 145 $s^{-1}$.

In some examples, the release layer composition may have a viscosity of less than 0.398 Pas at a shear rate of greater than 160 $s^{-1}$.

In some examples, the release layer composition may have a viscosity of less than 0.370 Pas at a shear rate of greater than 187 $s^{-1}$.

In some examples, the release layer composition may have a viscosity of less than 0.364 Pas at a shear rate of greater than 200 $s^{-1}$.

In some examples, the release layer composition may have a viscosity of less than 0.330 Pas at a shear rate of greater than 250 $s^{-1}$.

In some examples, the release layer composition may have a viscosity of greater than 500 Pas at a shear rate of less than 0.016 s⁻¹, for instance, greater than 700 Pa·s at a shear rate of less than 0.016 s⁻¹, greater than 800 Pa·s at a shear rate of less than 0.016 s⁻¹ or greater than 900 Pa·s at a shear rate of less than 0.016 s⁻¹; and a viscosity of less than 0.4 Pa·s at a shear rate of greater than 145 s⁻¹, or less than 0.370 Pa·s at a shear rate of greater than 187 s⁻¹.

In some examples, the release layer composition may have a viscosity in the range of 986-926 Pa·s at a shear rate of 0.0154-0.0166 s⁻¹ and/or a viscosity of 732-676 Pa·s at a shear rate of 0.021-0.022 s⁻¹. However, when shear is increased, the viscosity of the release layer composition may decrease. For instance, the release layer composition may have a viscosity of 95.0-102 Pa·s at a shear rate of 0.506-0.0488 s⁻¹, and a viscosity of 234-254 Pa·s at a shear rate of 0.345-0.334 s⁻¹. In some examples, the viscosity may reduce further, for example, to less than 1 Pa·s at shear rates of greater than 30 s⁻¹, for example, to less than 0.4 Pa·s at shear rates of greater than 145 s⁻¹.

During the spray-coating step, the blanket body may be moved so as to subject the release layer composition to a shear rate of at least 100 s⁻¹ as it deposits on the blanket body. In some examples, this shear rate may be, for example, at least 120 s⁻¹, at least 130 s⁻¹, at least 140 s⁻¹, at least 150 s⁻¹, at least 160 s⁻¹, at least 170 s⁻¹ and/or at least 180 s⁻¹. In some examples, the shear rate may be 188 s⁻¹, for example, at least 201 s⁻¹ as it deposits on the blanket body. In some examples, the release layer composition is subjected to a shear rate of 273 to 294 s⁻¹, or for example, 317 to 341 s⁻¹ as it deposits on the blanket body. Thus, the viscosity of the release layer composition may be less than 0.4 Pa·s, for example, less than 0.39 Pa·s, less than 0.38 Pa·s, for example, less than 0.37 Pa·s, less than 0.36 Pa·s, less than 0.35 Pa·s, less than 3.4 Pa·s, less than 3.3 Pa·s, less than 3.2 Pa·s. In some examples, the viscosity may be 0.3 to 0.4 Pa·s as it deposits on the blanket body, for example, 0.30 to 0.39 Pa·s, 0.31 to 0.38 Pa·s as it deposits on the blanket body.

The release layer composition may be used to form the release layer of the blanket. The release layer may have a controlled bulk swelling capacity of less than or equal to about 145%. In some examples, the release layer may have a bulk swelling capacity of at least about 120%. In some examples, the release layer may have a bulk swelling capacity of between about 130% and about 145%. For the purposes of this disclosure, the "bulk swelling capacity" of the release layer determined according to the following test. A dry film have a thickness of between 1 to 3 mm is initially weighed to determine a dry weight of the film. The dry film is then immersed in Isopar L in a sealed container. After 20 hours at 100 degrees C., the film is cooled and is removed from the Isopar L with excess solvent blotted with a clean dry cloth. The swollen film (swollen with Isopar L) is weighed to determine its swollen weight. The bulk swelling capacity is defined by the following formula: (swollen weight−dry weight)/dry weight*100%.

The release layer may have an overall thickness of 0.1 μm to 30 μm (see below). As described above, the release layer comprises a plurality of sub-layers, wherein at least one of the sub-layers comprises a composition comprising solid particles of an electrically conductive material dispersed in a matrix of cured polysiloxane polymer. The sub-layers may comprise the same composition. Alternatively, the sub-layers may be formed of different compositions. The sub-layer structure arises because spray-coating allows the release layer to be constructed in a sublayer-by-sublayer process. This allows the composition of the release layer to be controlled and varied sublayer-by-sublayer, if desired.

The release layer may have an electrical conductivity of 10⁶ and 10¹¹ ohm-cm, for example, 10⁹ and 10¹¹ ohm-cm In one example, the UV-curable silicone release formulation may comprise a polyalkylsiloxane containing at least two vinyl groups; a polyalkylsiloxane cross-linker containing at least two Si—H bonds; and [Pt(acac)₂].

Polysiloxane Containing at Least Two Vinyl Groups

Where employed, the polyalkylsiloxane containing at least two vinyl groups may be selected from a linear polyalkylsiloxane containing at least two vinyl groups, a branched polyalkylsiloxane containing at least two vinyl groups, a cyclic polyalkylsiloxane containing at least two vinyl groups and mixtures thereof. In some examples, the polyalkylsiloxane containing at least two vinyl groups is a linear polyalkylsiloxane containing at least two vinyl groups.

In some examples, the polyalkylsiloxane containing at least two vinyl groups may comprise a vinyl-terminated polyalkylsiloxane having the following formula:

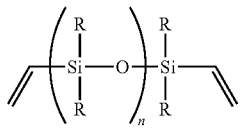

wherein each R is independently selected from C1 to C6 alkyl; and n is 1 or more. In some examples, each R is independently selected from C1, C2, C3, C4, C5 and C6 alkyl. In some examples, each R is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R is independently selected from methyl, ethyl, n-propyl, isopropyl, n-butyl, sec-butyl, isobutyl, and tert-butyl.

In some examples, each R is independently selected from methyl, ethyl, n-propyl, and isopropyl. In some examples, each R is the same. In some examples, each R is methyl.

In some examples, n is 1 or more, in some examples, 2 or more, in some examples, 5 or more, in some examples, 10 or more, in some examples, 50 or more, in some examples, 100 or more, in some examples, 150 or more, in some examples, 200 or more, in some examples, 250 or more, in some examples, 300 or more, in some examples, 350 or more, in some examples, 400 or more, in some examples, 450 or more more, in some examples, 500 or more, in some examples, 550 or more, in some examples, 600 or more, in some examples, 650 or more, in some examples, 700 or more, in some examples, 750 or more, in some examples, 800 or more, in some examples, 850 or more, in some examples, 900 or more, in some examples, 950 or more, in some examples, 1000 or more. In some examples, n is 1000 or less, in some examples, 950 or less, in some examples, 900 or less, in some examples, 850 or less, in some examples, 800 or less, in some examples 750 or less, in some examples, 700 or less, in some examples, 650 or less, in some examples, 600 or less, in some examples, 550 or less, in some examples, 500 or less, in some examples, 450 or less, in some examples, 400 or less, in some examples, 350 or less, in some examples, 300 or less, in some examples, 250 or less, in some examples, 200 or less, in some examples, 150 or less, in some examples, 100 or less, in some examples, 50 or less, in some examples, 10 or less, in some examples, 5 or less, in some examples, 2 or less. In some examples, n is 1 to 1000, in some examples, 10 to 950, in some examples, 50 to 900, in some examples, 100 to 850, in some examples, 150 to 800, in some examples, 200 to 750, in some examples, 250 to 700, in some examples, 300 to 650, in some examples, 350 to 600, in some examples, 400 to 550, in some examples, 450 to 500.

In some examples, the vinyl-terminated polyalkylsiloxane has a viscosity at 25° C. of 250 mPa·s or more, in some examples, 300 mPa·s or more, in some examples, 350 mPa·s or more, in some examples, 400 mPa·s or more, in some examples, 450 mPa·s or more, in some examples, 500 mPa·s or more, in some examples, 550 mPa·s or more, in some examples 600 mPa·s or more, in some examples, 650 mPa·s or more, in some examples, 700 mPa·s or more, in some examples, about 750 mPa·s. In some examples, the vinyl-terminated polyalkylsiloxane has a viscosity at 25° C. or 750 mPa·s or less, in some examples, 700 mPa·s or less, in some examples, 650 mPa·s or less, in some examples, 600 mPa·s or less, in some examples, 550 mPa·s or less, in some examples, 500 mPa·s or less, in some examples, 450 mPa·s or less, in some examples, 400 mPa·s or less, in some examples, 350 mPa·s or less, in some examples, 300 mPa·s or less, in some examples, about 250 mPa·s. In some examples, the vinyl-terminated polyalkylsiloxane has a viscosity at 25° C. of 250 mPa·s to 750 mPa·s, in some examples, 300 mPa·s to 700 mPa·s, in some examples, 350 mPa·s mPa·s, in some examples, 400 mPa·s to 600 mPa·s, in some examples, 450 mPa·s to 550 mPa·s, in some examples, 450 mPa·s to 500 mPa·s.

In some examples, the vinyl-terminated polyalkylsiloxane may have a vinyl content of 0.05 mmol/g or more, in some examples, 0.06 mmol/g or more, in some examples, 0.07 mmol/g or more, in some examples, 0.08 mmol/g or more, in some examples, 0.09 mmol/g or more, in some examples, 0.1 mmol/g or more, in some examples, 0.11 mmol/g or more, in some examples, 0.12 mmol/g or more, in some examples, 0.13 mmol/g or more, in some examples, 0.14 mmol/g or more, in some examples, 0.1 mmol/g or more, in some examples, 0.16 mmol/g or more, in some examples, 0.17 mmol/g or more, in some examples, 0.18 mmol/g or more, in some examples, 0.19 mmol/g or more, in some examples, 0.2 mmol/g or more, in some examples, 0.3 mmol/g or more, in some examples, 0.4 mmol/g or more, in some examples, 0.5 mmol/g or more, in some examples, about 0.6 mmol/g. In some examples, the vinyl-terminated polyalkylsiloxane may have a vinyl content of 0.6 mmol/g or less, in some examples, 0.5 mmol/g or less, in some examples, 0.4 mmol/g or less, in some examples, 0.3 mmol/g or less, in some examples, 0.2 mmol/g or less, in some examples, 0.19 mmol/g or less, in some examples, 0.18 mmol/g or less, in some examples, 0.17 mmol/g or less, in some examples, 0.16 mmol/g or less, in some examples, 0.15 mmol/g or less, in some examples, 0.14 mmol/g or less, in some examples, 0.13 mmol/g or less, in some examples, 0.12 mmol/g or less, in some examples, 0.11 mmol/g or less, in some examples, 0.1 mmol/g or less, in some examples, 0.09 mmol/g or less, in some examples, 0.08 mmol/g or less, in some examples, 0.07 mmol/g or less, in some examples, 0.06 mmol/g or less, in some examples, about 0.05 mmol/g. In some examples, the vinyl-terminated polyalkylsiloxane may have a vinyl content of 0.05 mmol/g to 0.6 mmol/g, in some examples, 0.06 mmol/g to 0.5 mmol/g, in some examples, 0.07 mmol/g to 0.4 mmol/g, in some examples, 0.08 mmol/g to 0.3 mmol/g, in some examples, 0.09 mmol/g to 0.2 mmol/g, in some examples, 0.1 mmol/g to 0.19 mmol/g, in some examples, 0.11 mmol/g to 0.18 mmol/g, in some examples, 0.12 mmol/g to 0.17 mmol/g, in some examples, 0.13 mmol/g to 0.16 mmol/g.

In some examples, the polyalkylsiloxane containing at least two vinyl groups comprises a pendent vinyl polyalkylsiloxane having the following formula:

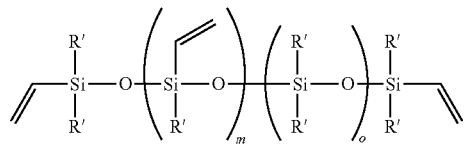

wherein each R' is independently selected from C1 to C6 alkyl; and m is 1 or more; and o is 0 or more.

In some examples, each R' is independently selected from C1, C2, C3, C4, C5 and C6 alkyl. In some examples, each R' is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R' is independently selected from methyl, ethyl, n-propyl, isopropyl, n-butyl, sec-butyl, isobutyl, and tert-butyl. In some examples, each R' is independently selected from methyl, ethyl, n-propyl, and isopropyl. In some examples, each R' is the same. In some examples, each R' is methyl.

In some examples, m is 1 or more, in some examples, 2 or more, in some examples, 5 or more, in some examples, 10 or more, in some examples, 50 or more, in some examples, 100 or more, in some examples, 150 or more, in some examples, 200 or more, in some examples, 250 or more, in some examples, 300 or more, in some examples, 350 or more, in some examples, 400 or more, in some examples, 450 or more, in some examples, 500 or more, in some examples, 550 or more, in some examples, 600 or more, in some examples, 650 or more, in some examples, 700 or more, in some examples, 750 or more, in some examples, 800 or more, in some examples, 850 or more, in some examples, 900 or more, in some examples, 950 or more, in some examples, 1000 or more. In some examples, m is 1000 or less, in some examples, 950 or less, in some examples, 900 or less, in some examples, 850 or less, in some examples, 800 or less, in some examples 750 or less, in some examples, 700 or less, in some examples, 650 or less, in some examples, 600 or less, in some examples, 550 or less, in some examples, 500 or less, in some examples, 450 or less, in some examples, 400 or less, in some examples, 350 or less, in some examples or less, in some examples, 250 or less, in some examples, 200 or less, in some examples, 150 or less, in some examples, 100 or less, in some examples, 50 or less, in some examples, 10 or less, in some examples 5 or less. In some examples, m is 1 to 1000, in some examples, 2 to 1000, in some examples, 10 to 950, in some examples, 50 to 900, in some examples, 100 to 850, in some examples, 150 to 800, in some examples, 200 to 750, in some examples, 250 to 700, in some examples, 300 to 650, in some examples, 350 to 600, in some examples, 400 to 550, in some examples, 450 to 500.

In some examples, o is 0 or more, in some examples, 1 or more, in some examples, 2 or more, in some examples, 5 or more, in some examples, 10 or more, in some examples, 50 or more, in some examples, 100 or more, in some examples, 150 or more, in some examples, 200 or more, in some examples, 250 or more, in some examples, 300 or more, in some examples, 350 or more, in some examples, 400 or more, in some examples, 450 or more, in some examples, 500 or more, in some examples, 550 or more, in some examples, 600 or more, in some examples, 650 or more, in some examples, 700 or more, in some examples, 750 or more, in some examples, 800 or more, in some examples, 850 or more, in some examples, 900 or more, in some examples, 950 or more, in some examples, 1000 or more. In some examples, o is 1000 or less, in some examples, 950 or less, in some examples, 900 or less, in some examples, 850 or less, in some examples, 800 or less, in some examples 750 or less, in some examples, 700 or less, in some examples, 650 or less, in some examples, 600 or less, in some examples, 550 or less, in some examples, 500 or less, in some examples, 450 or less, in some examples, 400 or less, in some examples, 350 or less, in some examples, 300 or less, in some examples, 250 or less, in some examples, 200 or less, in some examples, 150 or less, in some examples, 100 or less, in some examples, 50 or less, in some examples, 10 or less, in some examples, 5 or less. In some examples, o is 1 to 1000, in some examples, 2 to 1000, in some examples, 10 to 950, in some examples, 50 to 900, in some examples, 100 to 850, in some examples, 150 to 800, in some examples, 200 to 750, in some examples, 250 to 700, in some examples, 300 to 650, in some examples, 350 to 600, in some examples, 400 to 550, in some examples, 450 to 500.

In some examples, the pendent vinyl polyalkylsiloxane has a viscosity at 25° C. of 2500 mPa·s or more, in some examples, 2550 mPa·s or more, in some examples, 2600 mPa·s or more, in some examples, 2650 mPa·s or more, in some examples, 2700 mPa·s or more, in some examples, 2750 mPa·s or more, in some examples, 2800 mPa·s or more, in some examples 2900 mPa·s or more, in some examples, 3000 mPa·s or more, in some examples, 3050 mPa·s or more, in some examples, 3100 mPa·s or more, in some examples, 3150 mPa·s or more, in some examples, 3200 mPa·s or more, in some examples, 3250 mPa·s or more, in some examples, 3300 mPa·s or more, in some examples, 3350 mPa·s or more, in some examples, 3400 mPa·s or more, in some examples, 3450 mPa·s or more, in some examples, about 3500 mPa·s. In some examples, the pendent vinyl polyalkylsiloxane has a viscosity at 25° C. or 3500 mPa·s or less, in some examples, 3450 mPa·s or less, in some examples, 3400 mPa·s or less, in some examples, 3350 mPa·s or less, in some examples, 3300 mPa·s or less, in some examples, 3250 mPa·s or less, in some examples, 3200 mPa·s or less, in some examples, 3150 mPa·s or less, in some examples, 3100 mPa·s or less, in some examples, 3050 mPa·s or less, in some examples, 3000 mPa·s or less, in some examples, 2950 mPa·s or less, in some examples, 2900 mPa·s or less, in some examples, 2850 mPa·s or less, in some examples, 2800 mPa·s or less, in some examples, 2750 mPa·s or less, in some examples, 2700 mPa·s or less, in some examples, 2650 mPa·s or less, in some examples, about 2500 mPa·s. In some examples, the pendent vinyl polyalkylsiloxane has a viscosity at 25° C. of 2500 mPa·s to 3500 mPa·s, in some examples, 2550 mPa·s to 3450 mPa·s, in some examples, 2600 mPa·s to 3400 mPa·s, in some examples, 2650 mPa·s to 3350 mPa·s, in some examples, 2700 mPa·s to 3300 mPa·s, in some examples, 2750 mPa·s to 3250 mPa·s, in some examples, 2800 mPa·s to 3200 mPa·s, in some examples, 2850 mPa·s to 3150 mPa·s, in some examples, 2900 mPa·s to 3100 mPa·s, in some examples, 2950 mPa·s to 3050 mPa·s, in some examples, 3000 mPa·s to 3050 mPa·s.

In some examples, the pendent vinyl polyalkylsiloxane may have a vinyl content of 0.1 mmol/g or more, 0.2 mmol/g or more, in some examples, 0.3 mmol/g or more, in some examples, 0.4 mmol/g or more, in some examples, 0.5 mmol/g or more, in some examples, 0.6 mmol/g or more, in some examples, 0.7 mmol/g or more, in some examples, 0.8 mmol/g or more, in some examples, 0.9 mmol/g or more, in some examples, 1 mmol/g or more, in some examples, 2 mmol/g or more. In some examples, the vinyl-terminated polyalkylsiloxane may have a vinyl content of 2 mmol/g or less, in some examples, 1 mmol/g or less, in some examples, 0.9 mmol/g or less, in some examples, 0.8 mmol/g or less, in some examples, 0.7 mmol/g or less, in some examples, 0.6 mmol/g or less, in some examples, 0.5 mmol/g or less, in some examples, 0.4 mmol/g or less, in some examples, 0.3 mmol/g or less, in some examples, 0.2 mmol/g or less, in some examples, 0.1 mmol/g or less. In some examples, the vinyl-terminated polyalkylsiloxane may have a vinyl content of 0.1 mmol/g to 2 mmol/g, in some examples, 0.2 mmol/g to 1 mmol/g, in some examples, 0.3 mmol/g to 0.9 mmol/g, in some examples, 0.4 mmol/g to 0.8 mmol/g, in some examples, 0.5 mmol/g to 0.7 mmol/g, in some examples, 0.3 mmol/g to 0.6 mmol/g.

In some examples, the polyalkylsiloxane containing at least two vinyl groups comprises a mixture of a vinyl-terminated polyalkylsiloxane having the following formula

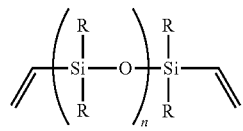

wherein each R is independently selected from C1 to C6 alkyl; and n is 1 or more; and a pendent vinyl polyalkylsiloxane having the following formula

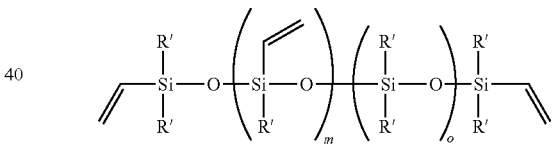

wherein each R' is independently selected from C1 to C6 alkyl; m is 1 or more; and o is 20 or more. In some examples, each R, each R', n, m and o may be as defined above.

In some examples, the polyalkylsiloxane containing at least two vinyl groups comprises a vinyl-terminated polyalkylsiloxane and a pendent vinyl polyalkylsiloxane. In some examples, the polyalkylsiloxane containing at least two vinyl groups comprises a mixture of vinyl-terminated polyalkylsiloxane and pendent vinyl polyalkylsiloxane in a ratio of from 1:10 to 10:1. In some examples, the polyalkylsiloxane containing at least two vinyl groups comprises a mixture of vinyl-terminated polyalkylsiloxane and pendent vinyl polyalkylsiloxane in a ratio of from 1:9 to 9:1 mixture, in some examples, from 1:8 to 8:1, in some examples, from 1:7 to 7:1, in some examples, from 1:6 to 6:1, in some examples, from 1:5 to 5:1, in some examples, from 1:4 to 4:1, in some examples, from 1:3 to 3:1, in some examples, from 1:2 to 2:1, in some examples, from 1:1 to 4:1. Suitable examples of the polyalkylsiloxane containing at least two vinyl groups include Polymer VS 50, Polymer VS 100, Polymer VS 200, Polymer VS 500, Polymer VS 1000, Polymer VS 200, Polymer RV 100, Polymer RV 200, Polymer RV 500, available from Evonik Industries. Other suitable examples include DMS-V00, DMS-V03, DMS-V05, DMS-V21, DMS-V22, DMS-V25, DMS-V31, DMS-V33, DMS-V34, DMS-V35, DMS-V41, DMS-V42, DMS-V43, DMS-V46, DMS-V51, and DMS-V52 from Gelest Inc., Stroofstrasse 27, Geb.2901, 65933 Frankfurt am Main, Germany.

Polyalkylsiloxane Cross-Linker Containing at Least Two Si—H Bonds

In some examples, the UV curable silicone release formulation comprises a polyalkylsiloxane cross-linker containing at least two Si—H bonds. In some examples, the polyalkylsiloxane cross-linker is selected from a linear polyalkylsiloxane cross-linker, a branched polyalkylsiloxane cross-linker and a cyclic polyalkylsiloxane cross-linker. In some examples, the polyalkylsiloxane cross-linker containing at least two Si—H bonds is a linear polyalkylsiloxane cross-linker.

In some examples, the polyalkylsiloxane containing at least two Si—H bonds comprises a polyalkylsiloxane cross-linker having the following formula:

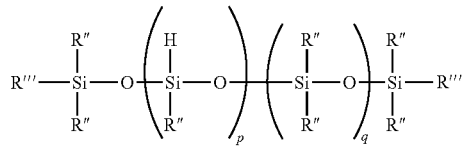

In some examples, each R" is independently selected from C1, C2, C3, C4, C5 and C6 alkyl. In some examples, each R" is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R" is independently selected from methyl, ethyl, n-propyl, isopropyl, n-butyl, sec-butyl, isobutyl, and tert-butyl. In some examples, each R" is independently selected from methyl, ethyl, n-propyl, and isopropyl. In some examples, each R" is the same. In some examples, each R" is methyl.

In some examples, each R''' is independently selected from H, C1, C2, C3, C4, C5 and C6 alkyl. In some examples, each R''' is independently selected from H, methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R''' is independently selected from H, methyl, ethyl, n-propyl, isopropyl, n-butyl, sec-butyl, isobutyl, and tert-butyl. In some examples, each R''' is independently selected from H, methyl, ethyl, n-propyl, and isopropyl. In some examples, each R''' is the same. In some examples, each R''' is H or methyl.

In some examples, p is 2 or more, in some examples, 3 or more, in some examples, 4 or more, in some examples, 5 or more, in some examples, 6 or more, in some examples, 7 or more, in some examples, 8 or more, in some examples, 9 or more, in some examples, in some examples, 10 or more, in some examples, 20 or more, in some examples, 50 or more. In some examples, p is 50 or less, in some examples, 20 or less, in some examples, 10 or less, in some examples, 9 or less, in some examples, 8 or less, in some examples, 7 or less, in some examples 6 or less, in some examples, 5 or less, in some examples, 4 or less, in some examples, 3 or less, in some examples, 2 or less. In some examples, p is 2 to 50, in some examples, 3 to 10, in some examples, 4 to 9, in some examples, 5 to 8, in some examples, 6 to 7.

In some examples, q is 0 or more, in some examples, 1 or more, in some examples, 2 or more, in some examples, 3 or more, in some examples, 4 or more, in some examples, 5 or more, in some examples, 6 or more, in some examples, 7 or more, in some examples, 8 or more, in some examples, 9 or more, in some examples, in some examples, 10 or more, in some examples, 20 or more, in some examples, 50 or more.

In some examples, q is 50 or less, in some examples, 20 or less, in some examples, 10 or less, in some examples, 9 or less, in some examples, 8 or less, in some examples, 7 or less, in some examples 6 or less, in some examples, 5 or less, in some examples, 4 or less, in some examples, 3 or less, in some examples, 2 or less, in some examples, 1 or less. In some examples, q is 0 to 50, in some examples, 1 to 10, in some examples, b2 to 9, in some examples, 3 to 8, in some examples, 4 to 7, in some examples, 5 to 6.

In some examples, the polyalkylsiloxane cross-linker may be a random copolymer, a block copolymer, an alternating copolymer or a periodic copolymer. In some examples, the polyalkylsiloxane cross-linker may be a random copolymer.

In some examples, the polyalkylsiloxane cross-linker has a viscosity at 25° C. of 5 mPa·s or more, in some examples, 10 mPa·s or more, in some examples, 15 mPa·s or more, in some examples, 20 mPa·s or more, in some examples, 25 mPa·s or more, in some examples, 30 mPa·s or more, in some examples, 35 mPa·s or more, in some examples 40 mPa·s or more, in some examples, 45 mPa·s or more, in some examples, 50 mPa·s or more, in some examples, 55 mPa·s or more, in some examples, 60 mPa·s or more, in some examples, 65 mPa·s or more, in some examples, 70 mPa·s or more, in some examples, 75 or more, in some examples, about 80 mPa·s. In some examples, the polyalkylsiloxane cross-linker has a viscosity at 25° C. or 80 mPa·s or less, in some examples, 75 mPa·s or less, in some examples, 70 mPa·s or less, in some examples, 65 mPa·s or less, in some examples, 60 mPa·s or less, in some examples, 55 mPa·s or less, in some examples, 50 mPa·s or less, in some examples, 45 mPa·s or less, in some examples, 40 mPa·s or less, in some examples, 35 mPa·s or less, in some examples, 30 mPa·s or less, in some examples, 25 mPa·s or less, in some examples, 20 mPa·s or less, in some examples, 15 mPa·s or less, in some examples, about 10 mPa·s. In some examples, the polyalkylsiloxane cross-linker has a viscosity at 25° C. of 10 mPa·s to 80 mPa·s, in some examples, 15 mPa·s to 75 mPa·s, in some examples, 20 mPa·s to 70 mPa·s, in some examples, 25 mPa·s to 65 mPa·s, in some examples, 30 mPa·s to 60 mPa·s, in some examples, 35 mPa·s to 55 mPa·s, in some examples, 40 mPa·s to 50 mPa·s, in some examples, 40 mPa·s to 45 mPa·s.

In some examples, the polyalkylsiloxane cross-linker may have an Si—H content of 1 mmol/g or more, in some examples, 2 mmol/g or more, in some examples, 3 mmol/g or more, in some examples, 3.5 mmol/g or more, in some examples, 4 mmol/g or more, in some examples, 4.1 mmol/g or more, in some examples, 4.2 mmol/g or more, in some examples, 4.3 mmol/g or more, in some examples, 4.5 mmol/g or more, in some examples, 5 mmol/g or more, in some examples, 6 mmol/g or more, in some examples, 7 mmol/g or more, in some examples, about 8 mmol/g. In some examples, the polyalkylsiloxane cross-linker may have an Si—H content of 8 mmol/g or less, in some examples, 7 mmol/g or less, in some examples, 6 mmol/g or less, in some examples, 5 mmol/g or less, in some examples, 4.5 mmol/g or less, in some examples, 4.4 mmol/g or less, in some examples, 4.3 mmol/g or less, in some examples, 4.2 mmol/g or less, in some examples, 4.1 mmol/g or less, in some examples, 4 mmol/g or less, in some examples, 3.5 mmol/g or less, in some examples, 3 mmol/g or less, in some examples, 2 mmol/g or less, in some examples, about 1 mmol/g. In some examples, the polyalkylsiloxane cross-linker may have an Si—H content of 1 mmol/g to 8 mmol/g, in some examples, 2 mmol/g to 7 mmol/g, in some examples, 3 mmol/g to 6 mmol/g, in some examples, 3.5 mmol/g mmol/g to 5 mmol/g, in some examples, 4 mmol/g to 4.5 mmol/g, in some examples, 4.1 mmol/g to 4.4 mmol/g, in some examples, 4.2 mmol/g to 4.3 mmol/g.

Suitable examples of the polyalkylsiloxane cross-linker include Cross-linker 200, Cross-linker 210, Cross-linker 100, Cross-linker 101, Cross-linker 120, Cross-linker 125 or Cross-linker 190, available from Evonik Industries. Other suitable crosslinkers include HMS-031, HMS-071, HMS-082, HMS-013, and HMS-064 from Gelest Inc., Stroofstrasse 27, Geb.2901, 65933 Frankfurt am Main, Germany). In some examples, the UV curable silicone release formulation comprises a ratio of polyalkylsiloxane containing cross-linker to polyalkylsiloxane containing at least two vinyl groups such that the mole ratio of hydride to vinyl is from 4:1 to 1:4. In some examples, the UV curable silicone release formulation comprises a ratio of polyalkylsiloxane containing cross-linker to polyalkylsiloxane containing at least two vinyl groups such that the mole ratio of hydride to vinyl is from 3:1 to 1:3, in some examples, 2.5:1 to 1:2.5, in some examples, 2:1 to 1:2, in some examples, 2:1 to 1:1, in some examples, about 2:1, for example, 2.1:1.

In some examples, the weight ratio of polyalkylsiloxane containing cross-linker to polyalkylsiloxane containing at least two vinyl groups of from 1:20 to 1:1, in some examples, 1:19 to 1:2, in some examples, 1:18 to 1:3, in some examples, 1:17 to 1:4, in some examples, 1:16 to 1:5, in some examples, 1:15 to 1:6, in some examples, 1:14 to 1:7, in some examples, 1:13 to 1:8, in some examples, 1:12 to 1:9, in some examples, 1:11 to 1:10.

[Pt(acac)$_2$]

In some examples, the UV curable silicone release formulation may comprise (by weight 2000 ppm or less [Pt(acac)$_2$], in some examples, 1500 ppm or less, in some examples, 1000 ppm or less, in some examples, 500 ppm or less, in some examples, 250 ppm or less, in some examples, 200 ppm or less, in some examples, 150 ppm or less, in some examples, 100 ppm or less, in some examples, 95 ppm or less, in some examples, 90 ppm or less, in some examples, 85 ppm or less, in some examples, 80 ppm or less, in some examples, 75 ppm or less, in some examples, 70 ppm or less, in some examples, 65 ppm or less, in some examples, 60 ppm or less, in some examples, 55 ppm or less, in some examples, 50 ppm or less, in some examples, 45 ppm or less, in some examples, 40 ppm or less, in some examples, 35 ppm or less, in some examples, 30 ppm or less, in some examples, 25 ppm or less, in some examples, 20 ppm or less, in some examples, 15 ppm or less, in some examples, 10 ppm or less, in some examples, 5 ppm or less, in some examples, about 1 ppm [Pt(acac)$_2$].

In some examples, the UV curable silicone release formulation may comprise (by weight) 1 ppm or more [Pt(acac)$_2$], in some examples, 5 ppm or more, in some examples, 10 ppm or more, in some examples, 15 ppm or more, in some examples, 20 ppm or more, in some examples, 25 ppm or more, in some examples, 30 ppm or more, in some examples, 40 ppm or more, in some examples, 45 ppm or more, in some examples, 50 ppm or more, in some examples, 55 ppm or more, in some examples, 60 ppm or more, in some examples, 65 ppm or more, in some examples, 70 ppm or more, in some examples, 75 ppm or more, in some examples, 80 ppm or more, in some examples, 85 ppm or more, in some examples, 90 ppm or more, in some examples, 95 ppm or more, in some examples, 100 ppm or more, in some examples, 125 ppm or more, in some examples, 150 ppm or more, in some examples, 200 ppm or more [Pt(acac)$_2$]. In some examples, the UV curable silicone release formulation may comprise (by weight) 1 ppm to 2000 ppm [Pt(acac)$_2$], in some examples, 5 ppm to 1500 ppm, in some examples, 10 ppm to 1000 ppm, in some examples, 10 ppm to 500 ppm, in some examples, 15 ppm to 250 ppm, in some examples, 20 ppm to 200 ppm, in some examples, 25 ppm to 150 ppm, in some examples, 30 ppm to 100 ppm, in some examples, 35 ppm to 95 ppm, in some examples 40 ppm to 90 ppm, in some examples, 45 ppm to 85 ppm, in some examples, 50 ppm to 80 ppm, in some examples, 55 ppm to 75 ppm, in some examples, 60 ppm to 70 ppm, in some examples, 40 ppm to 65 ppm [Pt(acac)$_2$].

Thermal Inhibitor

In some examples, the UV curable silicone release formulation comprises a thermal inhibitor. In some examples, the thermal inhibitor comprises an acetylenic alcohol or an alkanol. In some examples, the thermal inhibitor inhibits thermal curing of the polyalkylsiloxane containing at least two vinyl groups and the polyalkylsiloxane cross-linker. Although no catalyst for thermal activation of the cross-linking reaction is present in the UV curable silicone release formulation, thermal curing may be initiated during high shear mixing of the UV curable silicone release formulation due to degradation of the [Pt(acac)$_2$] and therefore the presence of a thermal inhibitor suppresses this reaction, suppressing the associated increase in viscosity of the UV curable silicone release formulation. In some examples, the UV curable silicone release formulation comprises 0.01 wt. % to 10 wt. % thermal inhibitor, in some examples, 0.05 wt. % to 9 wt. %, in some examples, 0.1 wt. % to 8 wt. %, in some examples, 0.1 wt. % to 7 wt. %, in some examples, 0.5 wt. % to 6 wt. %, in some examples, 1 wt. % to 5 wt. %, in some examples, 1.5 wt. % to 4 wt. %, in some examples, 2 wt. % to 3.5 wt. %, in some examples, 2.5 wt. % to 3 wt. % thermal inhibitor. In some examples, no thermal inhibitor is used. Suitable examples of the thermal inhibitor include Inhibitor 600, Inhibitor 500 and Inhibitor 400 from Evonik. Other suitable thermal inhibitors include 1,3-divinyltetramethyldisiloxane ($C_8H_{18}OSi_2$) and 1,3,5,7-tetravinyl-1,3,5,7-tetramethylcyclotetrasiloxane ($C_{12}H_{24}O_4Si_4$), both from Gelest Inc.

Particles of Electrically Conductive Material

Any suitable electrically conductive material may be present in the release layer composition. The electrically conductive material may facilitate the application of a transfer voltage to the release layer to facilitate the transfer of imaging material from the photoconductive surface to the intermediate transfer blanket, and/or from the intermediate transfer blanket to the print substrate.

In some examples, the particles of electrically conductive material (also termed "conductive particles") may be carbon black particles, graphene and/or carbon nanotubes.

In some examples, the release composition may comprise 0.01 wt. % to 20 conductive particles, in some examples, 0.05 wt. % to 10 wt. %, in some examples, 0.1 wt. % to 8 wt. %, in some examples, 0.25 wt. % to 7 wt. %, in some examples, 0.5 wt. % to 6 wt. %, in some examples, 0.75 wt. % to 5 wt. %, in some examples, 0.8 wt. % to 4 wt. %, in some examples, 0.85 wt. % to 3 wt. %, in some examples, 0.9 wt. % to 2.5 wt. %, in some examples, 0.95 wt. % to 2 wt. %, in some examples, 1 wt. % to 1.5 wt. % conductive particles.

Suitable examples of the conductive particles include carbon black particles from AkzoNobel under the name Ketjenblack® EC600JD.

Producing the Release Layer Composition

The release layer composition may be produced using any suitable method. For example, the polysiloxane polymer may be combined with the electrically conductive particles and the resulting composition applied to the blanket body and cured.

In some examples, a polyalkylsiloxane containing at least two vinyl groups may be combined with a polyalkylsiloxane cross-linker containing at least two Si—H bonds.

In some examples, a polyalkylsiloxane containing at least two vinyl groups may be combined with conductive particles. In some examples, the polyalkylsiloxane containing at least two vinyl groups is combined with conductive particles under high shear mixing. In some examples, the high shear mixing is at 3,000 rpm or more, in some examples, 3,500 rpm or more, in some examples, 4,000 rpm or more, in some examples, 4,500 rpm or more, in some examples, 5,000 rpm or more, in some examples, 5,500 rpm or more, in some examples, 6,000 rpm or more, in some examples, 6,500 rpm or more, in some examples, 7,000 rpm or more, in some examples 7,500 rpm or more, in some examples, 8,000 rpm or more, in some examples, 8,500 rpm or more, in some examples, about 9,000 rpm. In some examples, the high shear mixing is at 9,000 rpm or less, in some examples, 8,500 rpm or less, in some examples, 8,000 rpm or less, in some examples, 7,500 rpm or less, in some examples, 7,000 rpm or less, in some examples, 6,500 rpm or less, in some examples, 6,000 rpm or less, in some examples, 5,500 rpm or less, in some examples, 5,000 rpm or less, in some examples, 4,500 rpm or less, in some examples, 4,000 rpm or less, in some examples, 3,500 rpm or less, in some examples, about 3,000 rpm. In some examples, the high shear mixing is at 3,000 rpm to 9,000 rpm, in some examples, 3,500 rpm to 8,500 rpm, in some examples, 4,000 rpm to 8,000 rpm, in some examples, 4,500 rpm to 7,500 rpm, in some examples, 5,000 rpm to 7,000 rpm, in some examples, 5,500 rpm to 6,500 rpm, in some examples, 6,000 rpm to 6,500 rpm.

In some examples, a polyalkylsiloxane containing at least two vinyl groups may be combined with conductive particles and then a polyalkylsiloxane cross-linker containing at least two Si—H bonds is added.

In some examples, the composition is then protected from light, for example, by wrapping the container in aluminium foil or using a container formed from a light-proof material, before [Pt(acac)$_2$] may be added. In some examples, [Pt(acac)$_2$] may be used as a solution in a liquid carrier, for example, as a solution in dioxane (e.g., 1,4-dioxane), or as a solution in tetrahydrofuran (THF) or as a solution in 1,2,4-trioxolane.

In some examples, a thermal inhibitor may be added. In some examples, the composition was subjected to high shear mixing to efficiently disperse the catalyst. In some examples, the high shear mixing is at 1,000 rpm or more, in some examples, 1,500 rpm or more, in some examples, 2,000 rpm or more, in some examples, 2,500 rpm or more, in some examples, 3,000 rpm or more, in some examples, 3,500 rpm or more, in some examples, 4,000 rpm or more, in some examples, 4,500 rpm or more, in some examples, about 5,000 rpm. In some examples, the high shear mixing is at 5,000 rpm or less, in some examples, 4,500 rpm or less, in some examples, 4,000 rpm or less, in some examples, 3,500 rpm or less, in some examples 3,000 rpm or less, in some examples, 2,500 rpm or less, in some examples, 2,000 rpm or less, in some examples, 1,500 rpm or less, in some examples, about 1,000 rpm. In some examples, the high shear mixing is at 1,000 rpm to 5,000 rpm, in some examples, 1,500 rpm to 4,500 rpm, in some examples, 2,000 rpm to 4,000 rpm, in some examples, 2,500 rpm to 3,500 rpm, in some examples, 3,000 rpm to 3,500 rpm.

In some examples, the temperature during mixing, for example, high shear mixing, was maintained at 100° C. or less, in some examples, at 95° C. or less, in some examples, at 90° C. or less, in some examples, 85° C. or less, in some examples, 80° C. or less, in some examples, 75° C. or less, in some examples, 70° C. or less, in some examples, 65° C. or less, in some examples, 60° C. or less, in some examples, 55° C. or less, in some examples, 50° C. or less.

In some examples, the UV curable silicone release formulation is stored in the dark.

Intermediate Transfer Blanket

The intermediate transfer blanket (sometimes referred to as "intermediate transfer member") may comprise a supportive portion on which the UV cured silicone release layer is disposed. The supportive portion may be termed the blanket body.

The intermediate transfer blanket may be disposed on a base, for example, a roller support to form an intermediate transfer member (ITM). The roller support may be formed of metal.

The supportive portion or blanket body may comprise a layered structure. The layered structure may comprise a compliant substrate layer on which the release layer composition may be disposed. The compliant substrate layer may comprise rubber or thermoplastic polyurethane.

The compliant substrate layer may be formed of a plurality of layers. For example, the compliant substrate layer may comprise a compressible layer and a compliance layer. The compliance layer may overly the compressible layer. A conductive layer may optionally be present. The conductive layer may be present intermediate the compressive and compliance layers.

In some examples, the compliant substrate layer overlies a fabric layer. This layer may be, for example, a woven or non-woven cotton, synthetic, combined natural and synthetic, or treated, for example, treated to have improved heat resistance, material.

Thus, in one example, the intermediate transfer blanket may comprise a fabric layer, a compliant substrate layer and a release layer. The compliant substrate layer may comprise a compressible layer and a compliance layer. A conductive layer may, for example, be disposed between the compressible and compliance layers.

In some examples, the compressible layer may comprise a thermoplastic polyurethane layer, or a rubber layer. This layer may, for example, comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS). In some examples, the compressible layer may comprise carbon black to increase its thermal conductivity.

In some examples, the compressible layer may include small voids, which may formedas a result of microspheres or blowing agents used in the formation of the compressible layer. In some examples, the small voids comprise about 40% to about 60% by volume of the compressible layer.

The compliance layer may comprise a thermoplastic polyurethane, a soft elastomeric material having a Shore A hardness value of less than about 65, or a Shore A hardness value of less than about 55 and greater than about 35, or a Shore A hardness value of between about 42 and about 45. Shore A hardness is determined by ASTM standard D2240.

In some examples, the compliance layer comprises a polyurethane, a thermoplastic polyurethane or an acrylic.

In some examples, the compliance layer comprises an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ), a fluorocarbon rubber (FKM or FPM) or a perfluorocarbon rubber (FFKM). In some examples, the compliance layer comprises a thermoplastic polyurethane.

In an example the compressible layer and the compliance layer are formed from the same material. However, the compliance layer may contain fewer voids.

The conductive layer may comprise a rubber, for example, an acrylic rubber (ACM), a nitrile rubber (NBR), a hydrogenated nitrile rubber (HNBR), or an EPDM rubber (an ethylene propylene diene terpolymer), and one or more conductive materials, including but not limited to carbon black or metallic particles. In some examples, the conductive layer may comprise a thermoplastic polyurethane and one or more conductive materials, including but not limited to carbon black or metallic particles.

In some examples, the compressible layer and/or the compliance layer may be made to be partially conducting with the addition of conducting particles, for example, conductive carbon black, metal particles or metal fibres. In some examples, where the compressible layer and/or the compliance layer are partially conducting there may be no requirement for a conductive layer.

The ITM may comprise a primer layer to facilitate bonding or joining of the UV curable silicone release layer to the compliant substrate layer. The primer layer may form part of the supportive portion of the ITM, in some examples, the primer layer is disposed on the compliant substrate layer.

The primer layer may be formed from a curable primer layer. The curable primer layer may be applied to the compliant substrate layer of the supportive portion of the ITM before a UV curable silicone release formulation is applied to the supportive portion.

The curable primer layer may comprise an organosilane and a catalyst, for example, a catalyst comprising titanium. In some examples, the organosilane contained in the curable primer layer is selected from an epoxysilane, a vinyl silane, an allyl silane and an unsaturated silane.

In some examples, the primer layer may comprise an organosilane, for example, an organosilane derived from an epoxysilane such as 3-glycidoxypropyltrimethoxysilane, a vinyl silane such as vinyltriethoxysilane or vinyltrimethoxysilane, an allyl silane, an acryloxysilane such as 3-methacryloxypropyltrimethoxysilane, or an unsaturated silane, and a catalyst such as a catalyst comprising titanium or platinum.

The curable primer layer may comprise a first primer and a first catalyst, and a second primer and, in some examples, a second catalyst. The first primer and/or the second primer may comprise an organosilane. The organosilane may be selected from an epoxysilane, a vinyl silane, an allyl silane and an unsaturated silane.

In some examples, the first catalyst is a catalyst for catalysing a condensation cure reaction, for example, a catalyst comprising titanium. The first primer may be cured by a condensation reaction by the first catalyst. The second primer may be cured by a condensation reaction by the first catalyst. In some examples, the second catalyst is a catalyst for catalysing an addition cure reaction.

The curable primer layer may be applied to the compliant layer as a composition containing the first and second primer and first and second catalyst.

In some examples the curable primer layer may be applied to the compliant layer as two separate compositions, one containing the first primer and first catalyst, the other containing the second primer and second catalyst. In some examples, the curable primer layer may be applied as two separate compositions, one containing the first primer (e.g., (3-glycidoxypropyl)trimethoxysilane and/or 3-methacryloxypropyltrimethoxysilane) and a photoinitiator (e.g., 2-hydroxy-2-methylpropiophenone), the other containing the second primer (e.g., (3-glycidoxypropyl)trimethoxysilane and/or vinyltrimethoxysilane) and a catalyst (e.g., titanium diisopropoxide bis(acetylacetonate) and/or platinum divinyltetramethyldisiloxane).

FIG. 1 is a cross-sectional diagram of an example of an intermediate transfer blanket. The blanket may be disposed on a supportive portion comprising a base 22 and a compliant substrate layer 23 may be disposed on the base 22. The base 22 may be a metal cylinder. The compliant substrate layer 23 may comprise or be a thermoplastic polyurethane layer. The ITM 20 also comprises a UV cured silicone release layer 30 disposed on the substrate layer 23. The UV cured silicone release layer 30 may be applied using a method of the present disclosure. The release layer 30 may be formed of a plurality of sub-layers (not shown).

The substrate layer 23 may comprise or further comprise (if it also comprises a thermoplastic polyurethane layer) a rubber layer which may comprise an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (FMQ or FLS), a fluorocarbon rubber (FKM or FPM) or a perfluorocarbon rubber (FFKM). For example, the rubber layer may comprise an at least partly cured acrylic rubber, for example an acrylic rubber comprising a blend of acrylic resin Hi-Temp 4051 EP (Zeon Europe GmbH, Niederkasseler Lohweg 177, 40547 Düsseldorf, Germany) filled with carbon black pearls 130 (Cabot, Two Seaport Lane, Suite 1300, Boston, Mass. 02210, USA).

Figure 2:
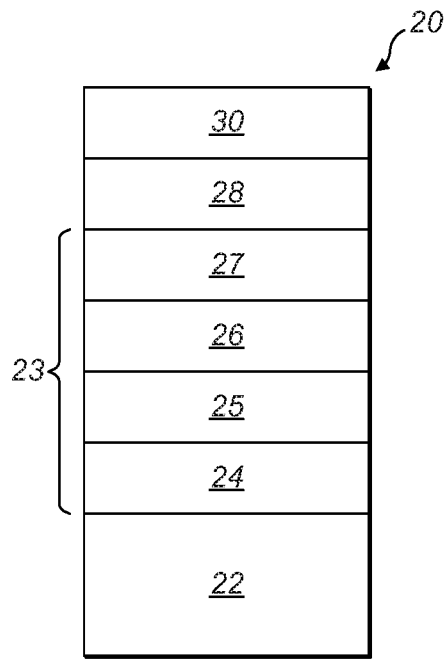

FIG. 2 shows a cross-sectional view of an example of an intermediate transfer blanket. In this blanket, the compliant substrate layer 23 comprises a compressible layer 25, a conductive layer 26 and a compliant layer 27. A fabric layer 24 may be disposed between the base 22 and a compressible layer 25 for joining the compressible layer 25 of the substrate layer 23 to the base 22.

A primer layer 28 may be disposed between the compliant substrate layer 23 and the UV cured silicone release layer 30. At least one of the layers 24 to 27 may comprise a thermoplastic polyurethane. As in FIG. 1, the release layer 30 may be applied using a method of the present disclosure. The release layer 30 may be formed of a plurality of sub-layers (not shown).

Figure 3:
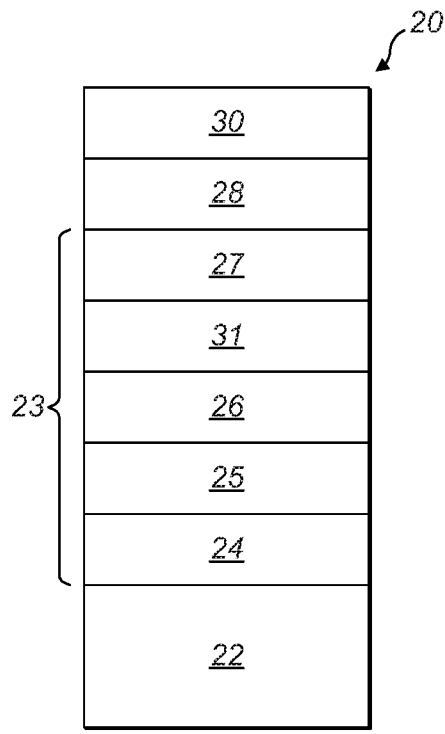

FIG. 3 shows a cross-sectional view of a blanket having a compliant substrate layer 23. A fabric layer 24 is disposed between the base 22 and a compressible layer 25 for joining the compressible layer 25 of the substrate layer 23 to the base 22. A conductive layer 26 is disposed on the compressible layer 25, a layer comprising a thermoplastic polyurethane 31 is disposed on the conductive layer 26, and a compliance layer 27 (also called a soft compliant layer) is disposed on the conductive layer 26. The UV cured silicone release layer 30 is disposed on a primer layer 28, which is disposed on the compliance layer 27. As in FIG. 1, the release layer 30 may be applied using a method of the present disclosure. The release layer 30 may be formed of a plurality of sub-layers (not shown).

Producing the Intermediate Transfer Blanket

As described above, the present disclosure relates to a method of producing an intermediate transfer blanket. The method comprises spray-coating a blanket body with a release layer composition comprising a curable polysiloxane polymer and solid particles of an electrically conductive material. The blanket body is subjected to motion during spray-coating, such that the release layer composition is subjected to shear forces as it deposits on the blanket body.

During the spray-coating step, the blanket body may be moved so as to subject the release layer composition to a shear rate of at least 100 s$^{-1}$ as it deposits on the blanket body. In some examples, this shear rate may be, for example, at least 120 s$^{-1}$, at least 130 s$^{-1}$, at least 140 s$^{-1}$, at least 150 s$^{-1}$, at least 160 s$^{-1}$, at least 170 s$^{-1}$ and/or at least 180 s$^{-1}$. In some examples, the shear rate may be 188 s$^{-1}$, for example, at least 201 s$^{-1}$ as it deposits on the blanket body. In some examples, the release layer composition is subjected to a shear rate of 273 to 294 s$^{-1}$, or for example, 317 to 341 s$^{-1}$ as it deposits on the blanket body. Thus, the viscosity of the release layer composition may be less than 0.4 Pas, for example, less than 0.39 Pas, less than 0.38 Pas, for example, less than 0.37 Pas, less than 0.36 Pas, less than 0.35 Pas, less than 3.4 Pas, less than 3.3 Pas, less than 3.2 Pas. In some examples, the viscosity may be 0.3 to 0.4 Pas as it deposits on the blanket body, for example, 0.30 to 0.39 Pas, 0.31 to 0.38 Pas as it deposits on the blanket body.

In the present disclosure, the release layer composition is subjected to shear forces as it deposits on the blanket body. These shear forces provide the deposited droplets with better droplet mobility. This increased droplet mobility can facilitate the formation of a more uniform and/or smoother coating.

Any suitable method may be used to subject the blanket body to motion to impart shear to the release layer composition as it deposits on the blanket body. In some examples, the blanket body is subjected to rotational motion during spray-coating. In some examples, a cylindrical drum, for instance, the interior of a cylindrical drum, is lined with a blanket body. The drum may then be rotated around a spray nozzle, while the spray nozzle ejects the release layer composition to spray-coat the blanket body.

Figure 4:
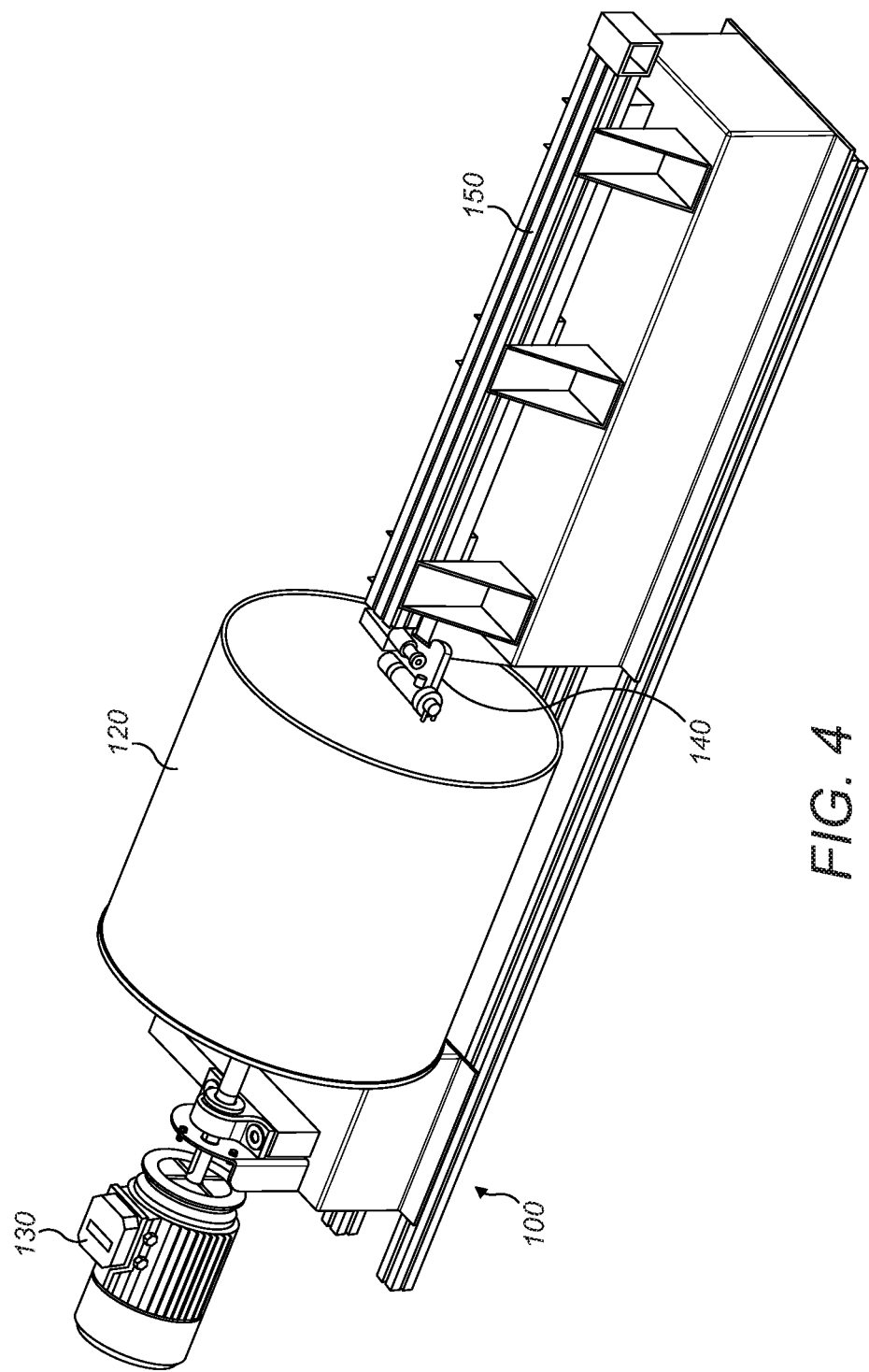
FIG. 4 is a schematic illustration of an apparatus that may be used to produce an intermediate transfer blanket according to one example of the method of the present disclosure.

FIG. 4 is a schematic illustration of an apparatus that may be used to produce an intermediate transfer blanket. The apparatus 100 comprises a cylindrical drum 120 that is rotatable about its longitudinal axis using motor 130. The apparatus 100 also includes a spray nozzle 140 mounted on slider 150, which can be used to move the nozzle 140 in and out of the cylindrical drum 120 along a fixed longitudinal path.

To use the apparatus, the interior of the cylindrical drum 120 may be lined with a blanket body (not shown). The cylindrical drum 120 may then be rotated about its longitudinal axis using the motor 130. The nozzle 140 may be moved into the cylindrical drum 120 by extending the slider 150 into the cylindrical drum. A release layer composition may be ejected through the nozzle 140 onto the inside of the cylindrical drum 120. Although the nozzle 140 may be fixed, rotation of the cylindrical drum 120 can allow the blanket lining the interior of the cylindrical drum 120 to be spray coated. The rotational movement may also ensure that the release layer composition is subjected to shear as it deposits on the blanket body. As the slider 150 is withdrawn from the cylindrical drum 120, a greater proportion of the blanket body may be coated.

The thickness of the coating may be controlled by controlling the speed at which the slider 150 is withdrawn from the cylindrical drum 120. Alternatively or additionally, the coating may be applied in multiple passes, allowing the release layer to be formed in a layer-by-layer process. By altering the release layer composition before some or each pass, the composition of the release layer may be varied.

In some examples, the release layer composition may be cured using UV radiation. The UV irradiation source may be an LED UV lamp, a Hg UV lamp, a Xenon arc lamp, or a microwave UV lamp. In some examples, the Xenon arc lamp is selected from a pure xenon arc lamp or a xenon-mercury arc lamp. In some examples, the radiation source is an LED UV lamp.

In some examples, the UV curable silicone release layer is cured by irradiating at a wavelength of about 10 nm to about 600 nm, in some examples, about 100 nm ton some examples, about 200 nm to about 500 nm, in some examples, about 300 to about 450 nm, in some examples, about 310 nm to about 440 nm, in some examples, about 320 nm to about 430 nm, in some examples, about 330 nm to about 420 nm, in some examples about 340 nm to about 410 nm, in some examples, about 350 nm to about 405 nm, in some examples, about 360 nm to about 400 nm, in some examples, about 365 nm to about 390 nm, in some examples, about 370 nm to about 385 nm, in some examples, about 375 nm to about 380 nm. In some examples, the UV curable silicone release layer is cured by irradiating at a wavelength of about 360 nm to about 370 nm, in some examples, about 380 nm to about 390 nm, in some examples, about 390 nm to about 400 nm, in some examples, about 400 nm to about 410 nm. In some examples, the UV curable silicone release layer is cured by irradiating at a wavelength of about 365 nm, about 385 nm, about 395 nm or about 405 nm.

In some examples, after irradiating with UV irradiation, the intermediate transfer blanket may be left at room temperature to ensure full curing of the UV curable silicone release layer prior to use in a digital offset printing apparatus. In some examples, after irradiating with UV irradiation, the intermediate transfer member was left at room temperature overnight to ensure full curing of the UV curable silicone release layer prior to use in a digital offset printing apparatus.

The release layer may have a layer thickness of 1 μm or more, for example, 1.5 μm or more, for example, 2 μm or more, for example, 3 μm or more, for example, 4 μm or more, for example, 5 μm or more, for example, 6 μm or more, for example, 7 μm or more, for example, 8 μm or more, for example, 9 μm or more.

In some examples, the release layer composition may be applied onto the blanket body, with a layer thickness of 40 μm or less, for example, 30 μm or less, 25 μm or less or 20 μm or less. In some examples, the thickness may be 15 μm or less, for example, 13 μm or less, for example, 12 μm or less.

Figure 5:
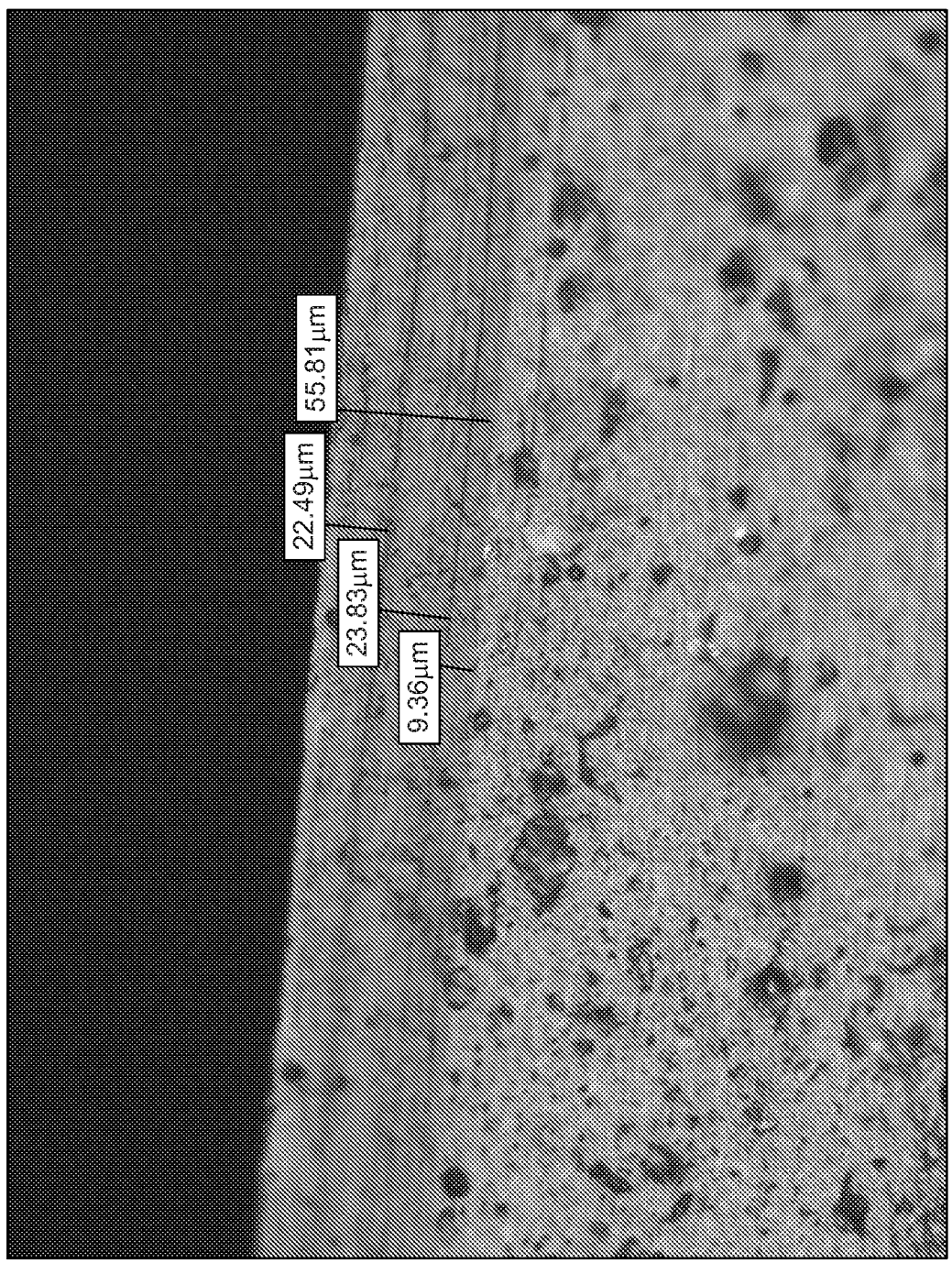
FIG. 5 is an SEM image showing an example release layer formed from sub-layers of release layer composition.

In some examples, the release layer composition may be applied in multiple sub-layers. The cumulative thicknesses of the individual sub-layers may make up the total thickness of the release layer. FIG. 5 shows the sub-layers of release layer composition deposited to form an example of a release layer.

Electro Photo Graphic Printer

Figure 6:
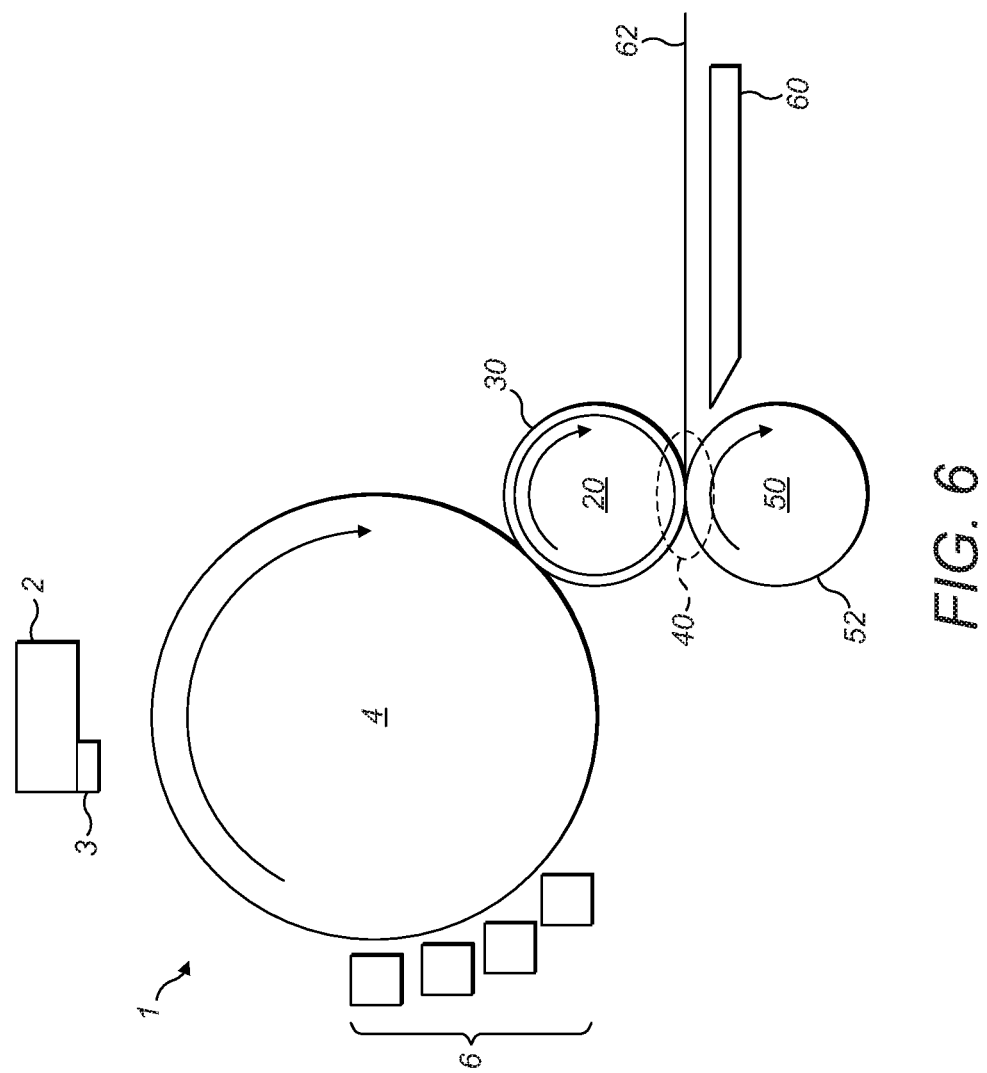
FIG. 6 is a schematic illustration of an example of an electrophotographic printer.

FIG. 6 shows a schematic illustration of an example of an electrophotographic printer 1 and the use of an intermediate transfer blanket therein. The electrophotographic printer may be a liquid electrophotographic printing apparatus or LEP printing apparatus.

The LEP printing apparatus includes a photo charging unit 2 and a photo-imaging cylinder 4. The image is initially formed on a photoimaging plate (also known as a photo-conductive member), in this case in the form of photo-imaging cylinder 4, before being transferred to a release layer 30 of the intermediate transfer member (ITM) 20 which is in the form of a roller (first transfer), and then from the release layer 30 of the ITM 20 to a print substrate 62 (second transfer).

An initial image may be formed on rotating photo-imaging cylinder 4 by photo charging unit 2. Firstly, photo charging unit 2 may deposit a uniform static charge on photo-imaging cylinder 4 and then a laser imaging portion 3 of photo charging unit 2 may dissipate the static charges in selected portions of the image area on the photo-imaging cylinder 4 to leave a latent electrostatic image. The latent electrostatic image is an electrostatic charge pattern representing the image to be printed.

Liquid electrophotographic ink may then be transferred to photo-imaging cylinder 4 by binary ink developer (BID) units 6. The BID units 6 present a uniform film of liquid electrophotographic ink to photo-imaging cylinder 4. The liquid electrophotographic ink may contain electrically charged pigment particles which, by virtue of an appropriate potential on the electrostatic image areas, are attracted to the latent electrostatic image on photo-imaging cylinder 4. The liquid electrophotographic ink does not adhere to the uncharged, non-image areas and forms a developed toner image on the surface of the latent electrostatic image. Photo-imaging cylinder 4 then has a single colour ink image on its surface.

The developed toner image may then be transferred from photo-imaging cylinder 4 to the release layer 30 of blanket 20 by electrical forces. The image is then dried and fused on silicone release layer 30 of blanket 20 before being transferred from release layer 30 of blanket 20 to a print substrate 52 disposed on impression cylinder 50. The process may then be repeated for each of the coloured ink layers to be included in the final image.

The image may then be transferred from photo-imaging cylinder 4 to blanket 20 by virtue of an appropriate potential applied between photo-imaging cylinder 4 and blanket 20, such that the charged ink is attracted to blanket 20.

Between the first and second transfers, the solid content of the developed toner image may be increased and the ink is fused on to blanket 20. For example, the solid content of the developed toner image deposited on silicone release layer 30 after the first transfer may be around 20%, by the second transfer the solid content of the developed toner image may be around 80-90%. This drying and fusing may be achieved by using elevated temperatures and airflow-assisted drying. In some examples, blanket 20 may be heated.

The print substrate 62 may be fed into the printer by print substrate feed tray 60 and may be disposed on impression cylinder 50. As print substrate 62 contacts ITM 20, the single colour image is transferred to print substrate 62.

To form a single colour image (such as a black and white image), one pass of print substrate 62 through impression cylinder 50 and blanket 20 may complete the image. For a multiple colour image, print substrate 62 may be retained on the impression cylinder 50 and make multiple contacts with blanket 20 as it passes through nip 40. At each contact an additional colour plane may be placed on print substrate 62.

EXAMPLES

Example 1

In this example, various release layer compositions were prepared.

The following materials were used:
Polymer VS500 (vinyl-terminated polydimethylsiloxane; available from Evonik Industries):

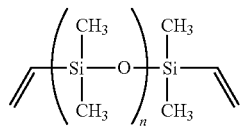

Polymer RV 5000 (pendent vinyl polydimethylsiloxane; available from Evonik Industries):

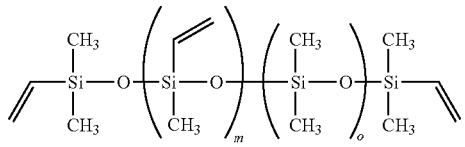

Viscosity: 3000 mPa s
Polymer RV 100 (pendant vinyl polydimethylsiloxane; available from Evonik industries)

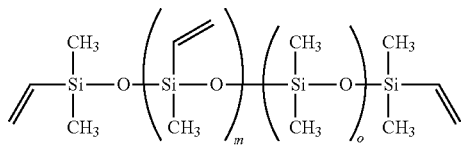

Viscosity: 100 mPa·s
Cross-linker 210 (CL210; a polydimethylsiloxane containing at least two Si—H bonds;
available from Evonik Industries):

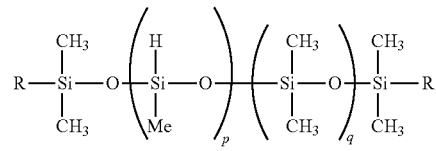

in which R=H or Me.
Inhibitor 600 (an alkinol in Polymer VS; available from Evonik Industries).
[Pt(acac)$_2$] (platinum (II) acetylacetonate; purchased from Sigma-Aldrich and used as received):

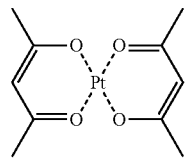

Catalyst 510 (0.5% platinum in isopropanol; available from Evonik Industries):

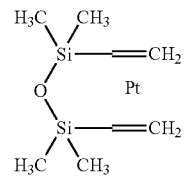

Carbon Black: Ketjenblack® EC600JD from AkzoNobel.
The release layer compositions A, B, C and D below were prepared as shown in the table below.

| COMPONENT | A % (w/w) | B % (w/w) | C % (w/w) | D % (w/w) |
|---|---|---|---|---|
| Polymer VS500 | 80 | 80 | 80 | 35 |
| Polymer RV 5000 | 20 | 20 | 20 | NR |
| Polymer RV 100 | NR | NR | NR | 65 |
| Sum | 100 | 100 | 100 | 100 |
| Additional components (percentage out of 100%) | | | | |
| Catalyst | Catalyst-510-0.5% | Catalyst-510-0.5% | [Pt(acac)$_2$] % 5.2 | Catalyst-510-0.5% |
| Inhibitor-600 | 5% | 5% | 5% | 5% |
| Cross-210 | 10% | 10% | 10% | 18% |
| Carbon Black | 0.8% | 0% | 0.8% | 0% |
| Dilution with Butyl acetate | Dilution to 1:1 weight ratio | Not diluted | Dilution to 1:1 weight ratio | Dilution 1:0.1 weight ratio |

Example 2

Figure 7:
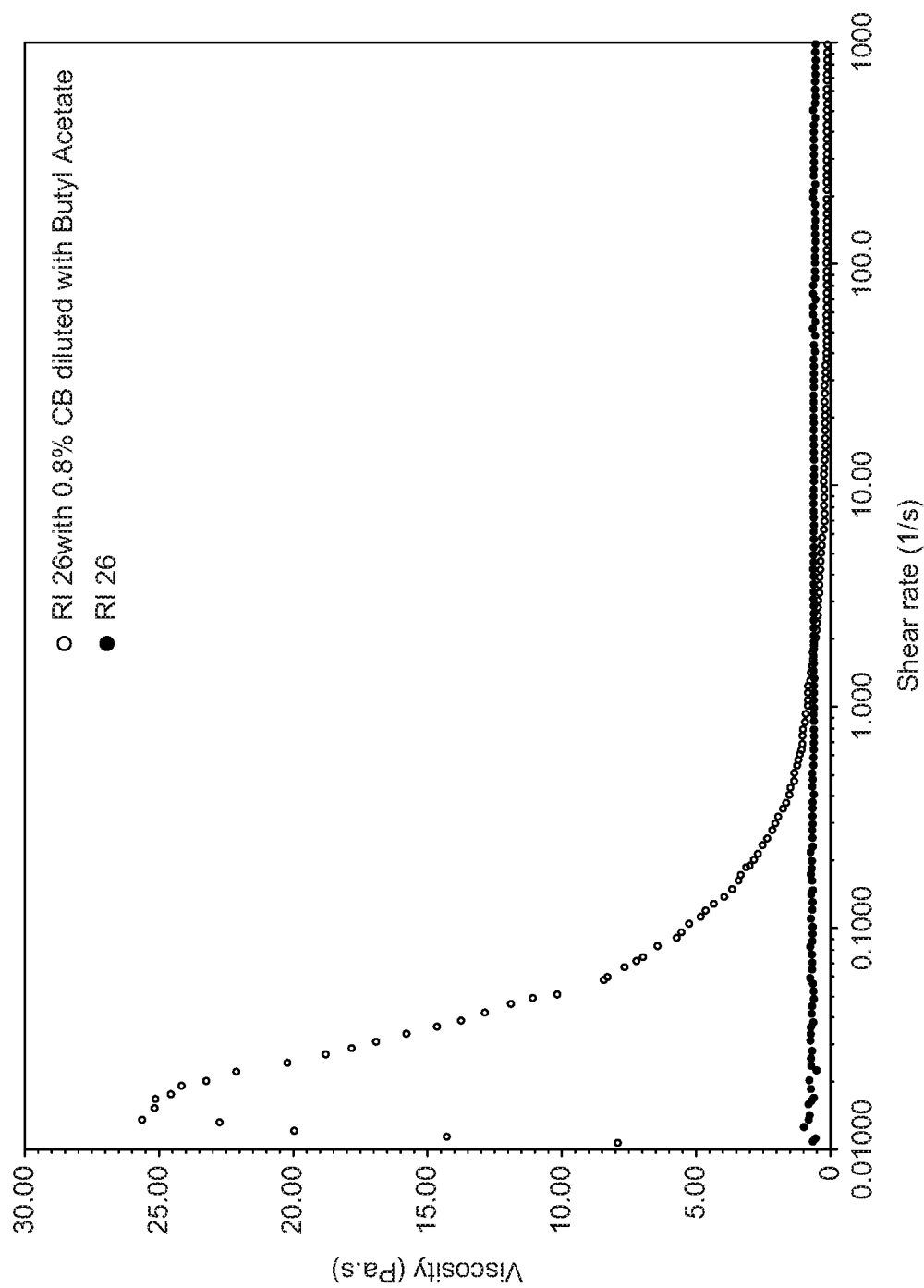
FIG. 7 shows the viscosity profile of the compositions analysed in Example 2.

The viscosity profile of a release layer compositions A and B were compared. The results are shown in FIG. 7. It can be seen that the viscosity of the release composition, Composition A, was very high at low shear rates but this decreased significantly at lower shear rates. (NB In FIG. 7, filled circles relate to measurements relating to Composition B, while empty circles relate to measurements relating to Composition A).

Example 3

Compositions A and B were applied to a blanket body by gravure coating and by spray coating the compositions onto a blanket body. In the case of the spray coating, the blanket body was kept stationary. The results are shown in the table below.

As can be seen from the table, spray-coating Composition A (containing carbon black) results in a release layer that is significantly rougher than a corresponding release layer formed by gravure coating the same composition onto the blanket body.

| | Gravure | | Spray coated | |
|---|---|---|---|---|
| Tested properties | W/O Carbon black B | 0.8% w/w Carbon black A | W/O Carbon black B | 0.8% w/w Carbon black A |
| Abrasion | 4 | 4 | 4 | 4 |
| Delta Gloss | 7 | 18.9 | 6 | 27.4 |
| Swelling degree (FT-IR method) | 0.41 | 0.42 | 0.4 | 0.38 |
| Contact angle (0) | 110.6 ± 0.88 (H2O) 79.8 ± 1.2 (CH3I) | 110.2 ± 0.4 (H2O) 76.3 ± 4.4 (CH3I) | 111.1 ± 0.1 (H2O) 74.8 ± 0.6 (CH3I) | 111.4 ± 1.5 (H2O) 84.9 ± 0.8 (CH3I) |
| Surface energy (mN/m) | 17.92 ± 0.7 | 19.6 ± 2.5 | 20.34 ± 0.33 | 15.6 ± 0.6 |
| Thickness of RL (micron) | 5.5 ± 0.5 | 6.2 | 6 ± 1 | 9.6 ± 1.3 |
| Surface Roughness* (Ra) | 0.6 ± 0.4 | 0.84 ± 0.54 | 0.6 ± 0.5 | 1.55 ± 1.15 |

*Surface Roughness was tested under the ultra nano scratcher of TriTec used as a profilometer with sensitivity of tens of nano meters. The sampling length was 3 mm, scratch performed with diamond tip of 20 microns (Data acquisition at 30 Hz)

Composition A was spray coated onto a blanket body. Spray-coating was carried out using the apparatus shown in FIG. 4. The inside of a drum was lined with blanket body. In test 1, the blanket body was kept static during spray-coating. In test 2, test 1 was repeated but the blanket was spun for 30 seconds after spray-coating. In test 3, the blanket was spun around the spray nozzle during spray coating. In test 4, Composition A was applied to the blanket body by gravure coating.

| Test | Surface Roughness* (Ra) | Dry Gloss | Wet Gloss | Delta Gloss | Thickness |
|---|---|---|---|---|---|
| 1 | 1.55 ± 1.15 | 39.7 | 12.3 | 27.4 | 9.6 ± 1.3 |
| 2 | 2.78 ± 2.00 | 39.9 | 10.6 | 29.3 | 8.7 ± 3.4 |
| 3 | 0.56 ± 0.43 | 42.5 | 13.9 | 28.6 | 6.0 ± 1.1 |
| 4 | 0.84 ± 0.54 | 71.1 | 51.8 | 18.9 | 6.2 |

It can be seen that the roughness of the coating is significantly reduced by spinning the blanket during the spray coating step.

The invention claimed is:

1. A method of producing an intermediate transfer blanket comprising:
spray-coating a blanket body with a release layer composition comprising a curable polysiloxane polymer and solid particles of an electrically conductive material,
wherein the blanket body is subjected to motion during spray-coating, such that the release layer composition is subjected to shear forces as it deposits on the blanket body,
wherein the curable polysiloxane polymer comprises:
a) a vinyl-terminated polyalkylsiloxane having the following formula

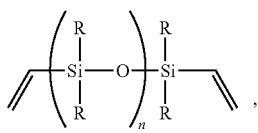

wherein each R is independently selected from C1 to C6 alkyl; and n is 1 or more;

b) a pendent vinyl polyalkylsiloxane having the following formula

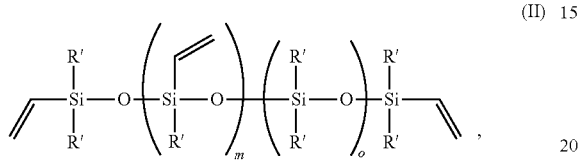

wherein each R' is independently selected from C1 to C6 alkyl, m is 1 or more, and o is 20 or more; or c) a mixture of the vinyl-terminated polyalkylsiloxanes of the Formulae (I) and (II).

2. A method as claimed in claim 1, wherein the blanket body is subjected to rotational motion during spray-coating.

3. A method as claimed in claim 2, which comprises rotating a cylindrical drum lined with a blanket body around a spray nozzle, while the spray nozzle ejects the release layer composition to spray-coat the blanket body.

4. A method as claimed in claim 1, wherein the electrically conductive material is carbon black.

5. A method as claimed in claim 1, wherein the release layer composition comprises 10 to 99.5 wt % of curable polysiloxane polymer.

6. A method as claimed in claim 1, wherein the release layer composition comprises 0.01 to 10 wt % of solid particles of an electrically conductive material.

7. A method as claimed in claim 1, wherein the release layer composition further comprises at least one of a catalyst, an inhibitor and a crosslinking agent.

8. A method as claimed in claim 1, which further comprises curing the spray-coated release layer composition.

9. A method as claimed in claim 1, which comprises spray-coating a plurality of layers of release layer composition onto a surface of the body blanket.

10. An intermediate transfer blanket comprising
a blanket body and a release layer deposited thereon,
wherein the release layer comprises a plurality of sub-layers, and
wherein at least one of the sub-layers comprises a composition comprising solid particles of an electrically conductive material dispersed in a matrix of cured polysiloxane polymer,
wherein the curable polysiloxane polymer comprises:

a) a vinyl-terminated polyalkylsiloxane having the following formula

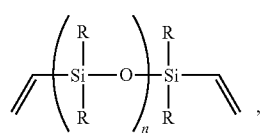

wherein each R is independently selected from C1 to C6 alkyl; and n is 1 or more;

b) a pendent vinyl polyalkylsiloxane having the following formula

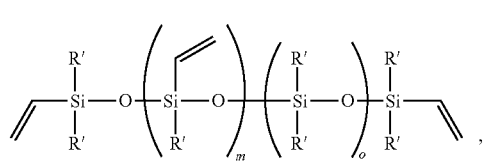

wherein each R' is independently selected from C1 to C6 alkyl, m is 1 or more, and o is 20 or more; or c) a mixture of the vinyl-terminated polyalkylsiloxanes of the Formulae (I) and (II).

11. A blanket as claimed in claim 10, wherein at least some of the sub-layers have different compositions.

12. A blanket as claimed in claim 10, wherein the release layer has a thickness of 0.1 to 30 μm.

13. A blanket as claimed in claim 10, wherein the release layer is seamless.

* * * * *